(12) United States Patent
Hu et al.

(10) Patent No.: US 6,230,226 B1
(45) Date of Patent: May 8, 2001

(54) COMPOUND DEVICE IMPLEMENTING HUB AND FUNCTION ENDPOINTS ON A SINGLE CHIP

(75) Inventors: King Seng Hu; Vui Yong Liew, both of Penang (MY); Bruce Moore, Glendale; Thomas Ohe, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/940,540

(22) Filed: Sep. 30, 1997

(51) Int. Cl.[7] .................................................. G06F 13/00
(52) U.S. Cl. ........................... 710/129; 710/107; 710/62; 710/63
(58) Field of Search ..................................... 710/102–103, 710/105, 107, 112, 128–129, 15, 16, 31, 37, 38, 42, 62, 63, 64, 72, 73

(56) References Cited

U.S. PATENT DOCUMENTS

| | | | |
|---|---|---|---|
| 5,675,813 | * 10/1997 | Holmdahl | 713/300 |
| 5,778,218 | * 7/1998 | Gulick | 713/503 |
| 5,784,581 | * 7/1998 | Hannah | 710/110 |
| 5,799,196 | * 8/1998 | Flannery | 713/320 |
| 5,818,948 | * 10/1998 | Gulick | 381/77 |
| 5,835,791 | * 11/1998 | Goff et al. | 710/62 |
| 5,871,368 | * 2/1999 | Erdner et al. | 439/188 |
| 5,884,086 | * 3/1999 | Amoni et al. | 713/300 |
| 5,890,015 | * 3/1999 | Garney et al. | 710/62 |
| 5,974,486 | * 10/1999 | Siddappa | 710/53 |

* cited by examiner

Primary Examiner—Robert Beausoleil
Assistant Examiner—Raymond N Phan
(74) Attorney, Agent, or Firm—Blakely, Sokoloff, Taylor & Zafman LLP

(57) ABSTRACT

A system and apparatus combining a hub and a function as a single chip compound device. A single serial interface engine (SIE) is shared between a hub endpoint and a function endpoint. The hub endpoint and function endpoint being integrated on a single chip. A single backend interface is coupled between the SIE and the endpoints. The backend interface selects which of the hub endpoints or the function endpoints can access the shared SIE at any time period. In one embodiment, a first address is associated with the hub and a second address is associated with the function. The backend interface selects between the hub and function by comparing a translated address received from the SIE with each of the first address and the second address. The result of the comparisons via suitable combinational logic serves as a select signal for a multiplexer between the hub/function and the SIE.

10 Claims, 2 Drawing Sheets

COMPOUND DEVICE IMPLEMENTING HUB AND FUNCTION ENDPOINTS ON A SINGLE CHIP

BACKGROUND OF THE INVENTION (1) Field of the Invention

The invention relates to a data processing system. More specifically, the invention relates to integration of hub and function endpoints on a single chip USB microcontroller within a Universal Serial Bus (USB) topology.

(2) Related Art

The Universal Serial Bus (USB) is a high-speed serial bus following a protocol defined in Universal Serial Bus Specification, Version 1.0 (USB Spec). Modification of this specification can be expected from time to time. The USB provides a standardized approach for peripheral interconnection with a host computer. The USB is set up in a tiered topology with a host on the top tier and USB hubs and functions on subsequent tiers. Each USB device, whether it be a hub or a function, has associated therewith a serial interface engine (SIE) which provides an interface between a backend interface and the transceiver which transmits or receives signals across the serial line. The backend interface manages the data transacted over the USB line.

The USB Spec defines a compound device to be a single physical device that combines one or more functions with a hub in a single package. One possible compound device is created using system level integration having functions implemented on the same board as the hub and always attached to the hub. This is a multi-chip solution including one hub chip and one or more function chips.

In view of the foregoing, it would be desirable to be able to produce a compound device having both hub and function endpoints on a single chip.

BRIEF SUMMARY OF THE INVENTION

A system and apparatus combining a hub and a function as a single chip compound device is disclosed. A single serial interface engine (SIE) is shared between a hub endpoint and a function endpoint. The hub endpoint and function endpoint being integrated on a single chip. A single backend interface is coupled between the SIE and the endpoints. The backend interface selects which of the hub endpoints or the function endpoints can access the shared SIE at any time period.

In one embodiment, a first address is associated with the hub and a second address is associated with the function. The backend interface selects between the hub and function by comparing a translated address received from the SIE with each of the first address and the second address. The result of the comparisons via suitable combinational logic serves as a select signal for a multiplexer between the hub/function and the SIE.

DETAILED DESCRIPTION OF THE INVENTION

Figure 1:
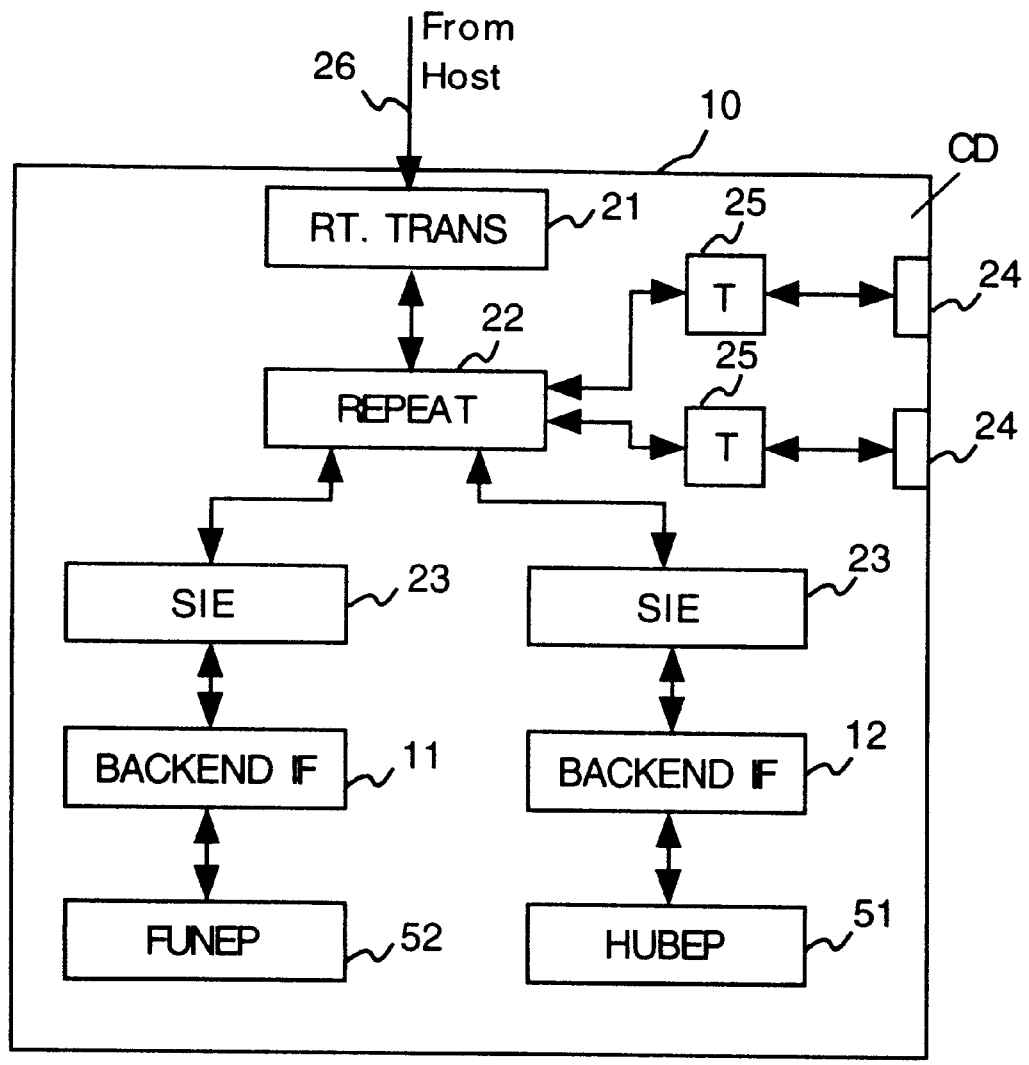
FIG. 1 is a block diagram of a prior art compound device.

FIG. 1 is a block diagram of a single chip compound device. Root transceiver 21 of compound device 10 is coupled to the universal serial bus (USB) 26. Signals received by the root transceiver 21 along USB 26 are transmitted to a hub repeater 22 by root transceiver 21. The repeater 22 then transmits the signals out to external downstream ports through the downstream transceivers 25, as well as to the serial interface engines (SIEs) 23 coupled to the internal hub and function endpoints 51 and 52. A backend interface 11 for the function endpoint 52 is coupled between SIE 23 and function endpoint 52. Similarly, a backend interface 12 for the hub endpoint 51 is coupled between a second independent SIE 23 and hub endpoint 51. Accordingly, in this implementation, two SIEs 23 and two backend interfaces (function interface 11 and hub interface 12) are required to implement a compound device. Unfortunately, because the area needed to instantiate a hub and function endpoint 51, 52 along with their corresponding SIEs 23 and backend interfaces 11, 12 is relatively large, the yield of single chip compound devices from a silicon wafer is relatively small and, therefore, the cost is quite high. Moreover, as is well known, large area devices are more susceptible to dust or other contaminates, further reducing the yield. Therefore, this single chip embodiment is not recommended.

Figure 2:
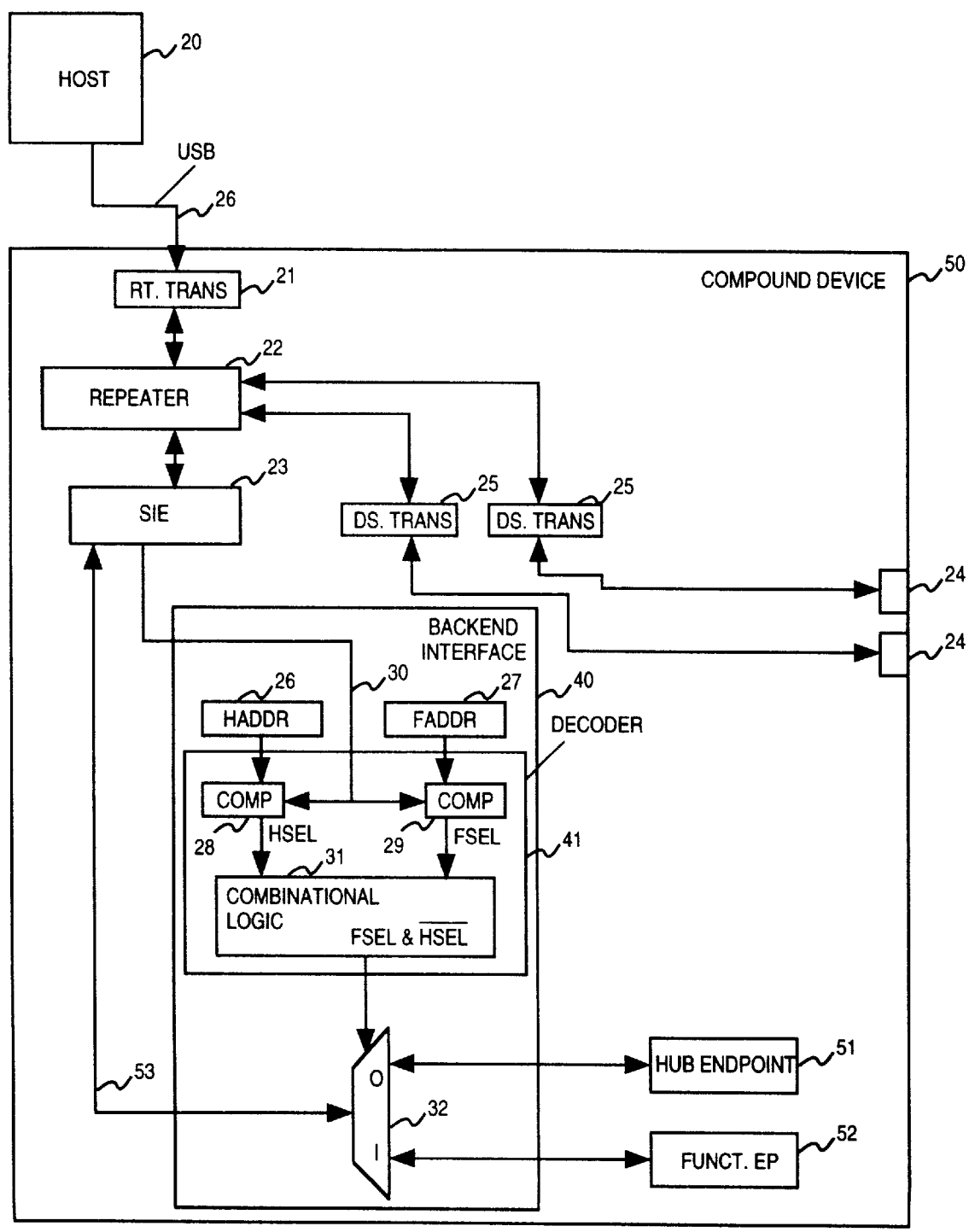
FIG. 2 is a block diagram of a system employing one embodiment of the invention.

FIG. 2 is a block diagram of a system employing one embodiment of the invention. A host 20 is coupled by a USB 26 to a compound device 50. The USB 26 is coupled to a root transceiver 21 of the compound device 50. Root transceiver 21 is in turn coupled to hub repeater 22 which broadcasts the signals received from the host transceiver to external downstream ports 24 through downstream transceivers 25. Repeater 22 also broadcasts the signals received from root transceiver 21 to the serial interface engine (SIE) 23 for possible use by the on-chip endpoints, hub endpoint 51 and function endpoint 52.

A single backend interface 40 provides an interface between both the hub endpoint 51 and the function endpoint 52 and the single SIE 23. The address corresponding to the hub endpoints is stored in a hub address register 26, and the address corresponding to the function endpoints is stored in a function address register 27. As will be understood by one of ordinary skill in the art, multiple hub or function endpoints exist on the single chip associated with a single address. Such is within the scope and contemplation of the invention. When an address is broadcast by the repeater 22 to the SIE 23, the SIE translates the address and forwards the address to comparators 28 and 29, along address line 30. Comparator 28 and 29 of decoder 41 compare the incoming address to the hub address and function address stored in hub address register 26 and function address register 27, respectively. The result of these comparisons are operated on by combinational logic 31 to generate a select signal for a multiplexer 32 to select between the hub endpoint 51 and the function endpoint 52 as a source or destination of data 53 transacted over the USB line corresponding to the address compared. By time multiplexing access to the single SIE, duplication of the SIE and backend interface can be eliminated. Implementing of decoder 41, the backend interface 40, requires very little additional chip spaces that were required by a prior art backend interface. Other features of the backend interface are consistent with the prior art and are not described here in detail. Thus, a significant reduction in real estate requirements to implement the compound device 50 are achieved without deviating from the USB Spec.

The backend interface, and in particular, decoder 41 must handle the special case of enumeration. During enumeration, the addresses of all devices are set to a common starting address. Thus, during enumeration, the address for the function endpoint 52 and the hub endpoint 51 will be the same. Accordingly, the hub address register 26 and the function address register will also be the same. Therefore, the result comparison with the incoming common starting address will result in both hub select and function select being asserted. It is desirable that in the special case where the addresses are the same, the hub endpoint 51 should be granted priority and assigned an address first before continuing with the enumeration in assigning the function endpoint 52 its own unique address. The combinational logic 31 can ensure priority of the hub by using an "and" function such that the function endpoint is selected only if function select is asserted and hub select is not asserted. Alternatively, this special case can be handled by disabling the internal function endpoint 52 until after enumeration of the hub has been completed.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:
    a single serial interface engine (SIE);
    a hub endpoint associated with the SIE;
    a function endpoint residing oh a single chip with the hub endpoint and sharing the SIE with the hub endpoint; and
    a backend interface coupled between the SIE and the hub and function endpoints, the backend interface selecting which of the hub and function endpoints can access the SIE during a time period.

2. The apparatus of claim 1 wherein the backend interface comprises:
    a first register storing a first address corresponding to the hub endpoint;
    a second register storing a second address corresponding to the function endpoint;
    a decoder to decode an address received from the SIE;
    a first comparator and a second comparator for comparing a decoded address with the first address and the second address respectively; and
    a multiplexor grating access to the SIE to only one of the hub endpoint and the function endpoint.

3. The apparatus of claim 2 wherein the backend interface further comprises:
    combinational logic ensuring that anytime the decoded address matches the first address, the hub endpoint is granted access to the SIE.

4. The apparatus of claim 1 wherein the hub disables an internal function port during enumeration.

5. A system comprising:
    a host processor; and
    a compound device coupled to the host processor, the compound device having a single serial interface engine (SIE) shared between a hub and an internal function endpoint.

6. The system of claim 5 wherein the compound device further comprises:
    a backend interface which selects which of the hub endpoint and the function endpoint can access the SIE during a time period.

7. The system of claim 6 wherein the backend interface grants priority to the hub endpoint if a received address matches both a hub address and a function address.

8. The system of claim 6 wherein an internal port to the internal function endpoint is disabled during enumeration.

9. A method comprising the steps of:
    integrating a hub endpoint and a function endpoint onto a single chip;
    sharing a serial interface engine (SIE) between the hub endpoint and the function endpoint on the chip; and
    time multiplexing access to the SIE between the hub endpoint and the function endpoint such that only one of the hub endpoint and the function endpoint can access the SIE during a single time period.

10. The method of claim 9 wherein the step of time multiplexing comprises the steps of:
    receiving a translated address from the SIE;
    decoding the address;
    comparing the address in parallel to each of a hub address and a function address;
    granting access to the hub endpoint if the address matches the hub address; and
    granting access to the function endpoint if the address matches the function address and the address does not match the hub address.

* * * * *

UNITED STATES PATENT AND TRADEMARK OFFICE
CERTIFICATE OF CORRECTION

PATENT NO.     : 6,230,226 B1
DATED          : May 8, 2001
INVENTOR(S)    : Hu et al.

It is certified that error appears in the above-identified patent and that said Letters Patent is hereby corrected as shown below:

Column 3,
Line 29, delete "oh" and insert -- on --.

Signed and Sealed this

Fourth Day of June, 2002

Attest:

JAMES E. ROGAN
Attesting Officer     Director of the United States Patent and Trademark Office